United States Patent [19]
Taylor

[11] Patent Number: 4,791,773
[45] Date of Patent: Dec. 20, 1988

[54] PANEL CONSTRUCTION

[76] Inventor: Lawrence H. Taylor, P.O. Box 49-58 - 48th St. Station, Union City, N.J. 07087

[21] Appl. No.: 9,519

[22] Filed: Feb. 2, 1987

[51] Int. Cl.$^4$ .............................. E04C 2/54
[52] U.S. Cl. ............................ 52/790; 52/304; 52/791; 52/800; 428/69; 428/182; 428/183
[58] Field of Search ............ 52/791, 793, 799, 304, 52/789, 790, 801, 802, 813, 800, 794; 428/69, 73, 182, 183

[56] References Cited

U.S. PATENT DOCUMENTS

| | | | |
|---|---|---|---|
| 1,984,007 | 12/1934 | Babbitt | 52/791 |
| 2,356,386 | 8/1944 | Couelle | 52/408 |
| 2,576,530 | 11/1951 | Medal | 52/584 |
| 2,638,187 | 5/1953 | Tate | 52/802 |
| 2,695,430 | 11/1954 | Wakefield | 52/790 X |
| 2,828,235 | 3/1958 | Holland et al. | 52/790 X |
| 3,376,684 | 4/1968 | Cole et al. | 52/635 |
| 3,756,902 | 9/1973 | Konecny et al. | 428/593 |
| 3,869,778 | 3/1975 | Yancey | 29/191 |
| 4,263,752 | 4/1981 | Jungbluth | 49/501 |
| 4,420,922 | 12/1983 | Wilson | 52/791 |
| 4,604,247 | 8/1986 | Chen et al. | 261/94 |
| 4,619,098 | 10/1986 | Taylor | 52/738 |

FOREIGN PATENT DOCUMENTS

| | | | |
|---|---|---|---|
| 449449 | 6/1948 | Canada | 52/793 |
| 151047 | 8/1955 | Finland | 52/793 |
| 1001639 | 2/1952 | France | 52/793 |
| 1045484 | 11/1953 | France | 52/793 |
| 367146 | 2/1932 | United Kingdom . | |

Primary Examiner—John E. Murtagh
Assistant Examiner—Andrew Joseph Rudy
Attorney, Agent, or Firm—Kerkam, Stowell, Kondracki & Clarke

[57] ABSTRACT

A pair of panel sheets form a sandwich with an undulated ribbon-like spacer in the interior thereof and marginal spacers about the periphery of the sheets. A vacuum within the space between the marginal spacers insulates and rigidifies the assembly.

3 Claims, 5 Drawing Sheets

FIG. 1.
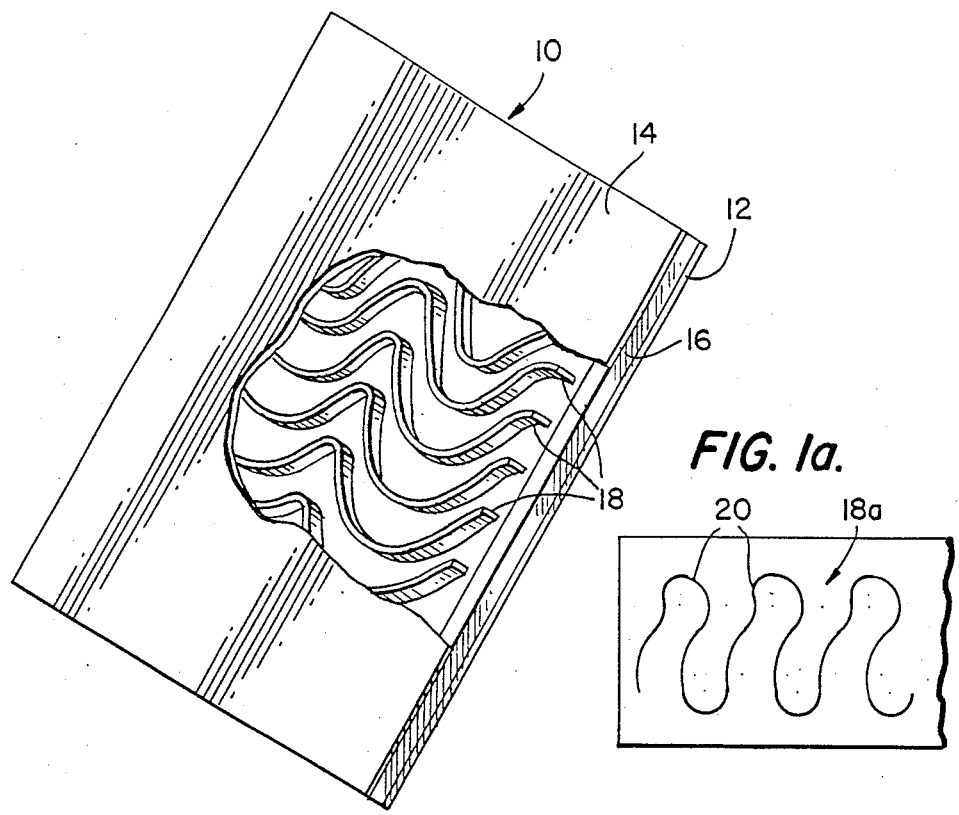
FIG. 1a.
FIG. 2.
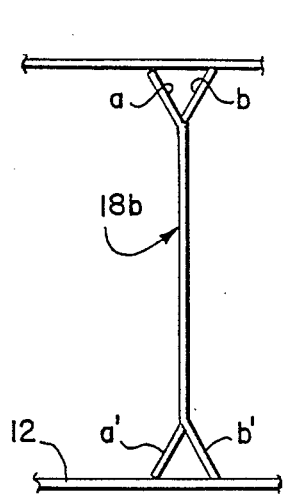
FIG. 3.
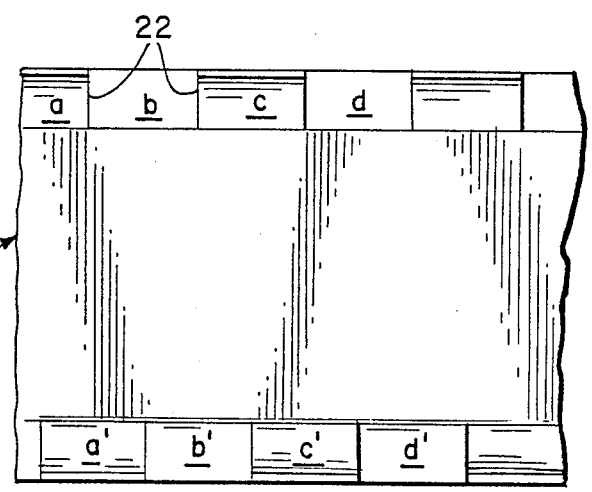

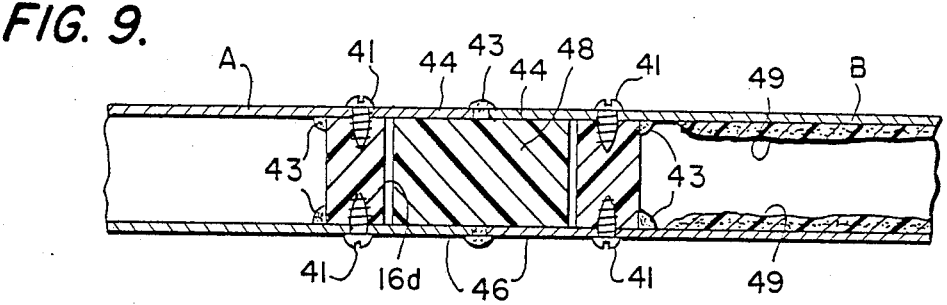
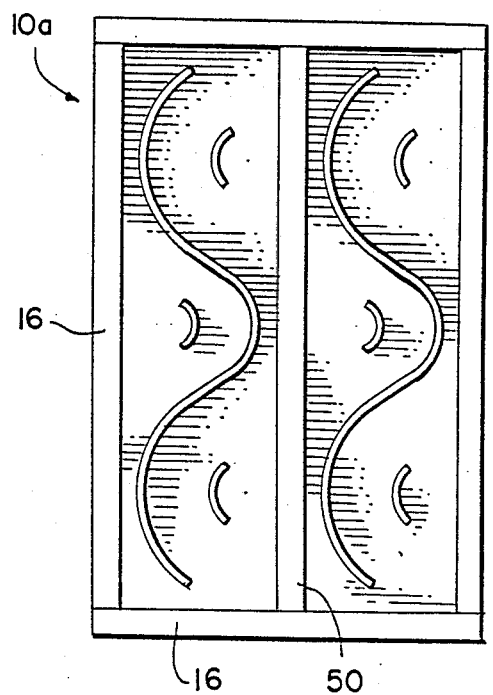
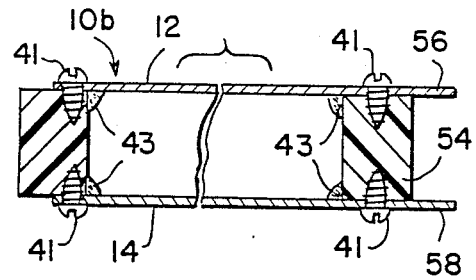
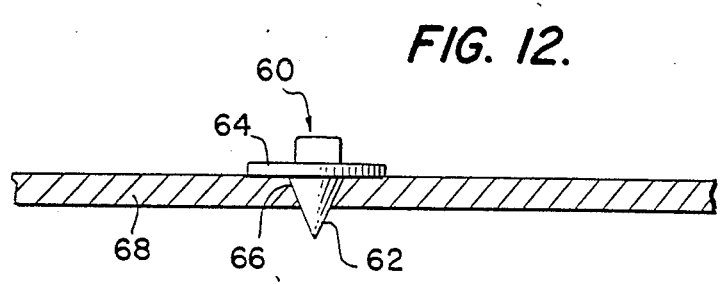

PANEL CONSTRUCTION

BACKGROUND OF THE INVENTION

This invention relates to a vacuum panel useful for load and non-load bearing walls of building structures.

Vacuum panels are old in the art and usually consist of a sandwich composed of a pair of exterior quadrangular sheets spaced apart by peripheral spacers and internal spacers and the assembly is rigidified by drawing a vacuum between the pair of sheets. It is known that one of the main problems faced by designers of vacuum panels is that the surface sheets of the panels tend to deform under strong vacuum and show the pattern of the interior supports that keep the exterior panel sheets from collapsing together when the vacuum is drawn. If such sheets are too light in gauge, the deformation by bending can reach a point of disfigurement and that requires expensive surface covering to hide the showing pattern results of the vacuum. If the sheets are of sufficiently heavy gauge initially to withstand the vacuum without deforming, then the panel becomes not only much more expensive, but also quite heavy for commercial use, especially in high-rise buildings where every ounce is counted. It is therefore of utmost importance that the design of the interior support structure not only resist heat transmission as much as possible, but also be designed in the optimum configuration to limit undesirable show through of interior support pattern to permit the use of the lightest possible gauge material. As the optimum configuration is being sought, the exterior support structure must be as rigid, yet as light as possible, while reducing heat transmission conduction as much as possible while retaining strength, impact resistance, and features that tend to low cost volume manufacture, with minimum tool cost and made from readily available materials. Quite obviously, the peripheral supports must meet the same design criteria and further be designed to rigidly support implosion pressures without special expensive and weight adding materials being put into the panel for this purpose. If the interior support structures are straight and contact the sheets in a straight line, then fold or crease lines will appear on the surface of the panels when the vacuum is pulled on the panels because, as it is well known, that sheet metal will crease in a straight line, when a curved crease, if possible, is not so readily created without much greater resistance. One prior art solution has been to construct the interior vacuum resisting supports in an egg crate configuration consisting of a plurality of vertical and horizontal members in plan view which are mutually supportive at their many junctions. One of the drawbacks with such a panel construction is this use of excessive material interiorly of the panel sheets because this crisscross internal structure provides unnecessary and excess support strength at intersection points in the panel where such support is unnecessary and the increased weight serves no purpose. The straight lines of the egg crate are more subject to crease deformation than curves.

SUMMARY OF THE INVENTION

Applicant has determined that in producing vacuum panels the following should be avoided:

Crossing of support lines which is wasteful of material, the support structures interiorly of the panels should also not have pointed or sharp points which in the prior art have been used to limit heat conduction, to reduce puncturing or push up points of surface deformation of the panels over support points when the vacuum is drawn, and the support structure should not have straight lines between support points which straight lines have a tendency to cause folding or creasing of the panel sheets when vacuum is drawn on the panel.

These and other disadvantages of prior art structures are overcome by a vacuum panel which, in its simplest form, comprises a pair of panel sheets which form a sandwich with an accurately spaced and undulated ribbon-like spacer in the interior thereof, and rigid marginal spacers of non-heat conductive and non-inflammable material about the peripheria of the sheets.

A vacuum panel composed of two face sheets held apart by vertical spacers located at the edges of the sheets with retainers on each sheet so that the vacuum between the sheets will pull the vertical edge spacers against the sealant covered stops on each sheet to keep the seal firm, with the center area between the side supports being supported by a specially formed serpentine vertical sheet metal strip that will by its shape use the minimum strip length of metal for inner support and reduce the appearance of crease lines caused by vacuum with the support strip further being pierced to reduce its conductivity and having a special form of edge serration and bending to reduce its contact conductivity between the panels and support member.

BRIEF DESCRIPTION OF THE DRAWING

FIG. 1 is a perspective view, with a portion broken away, illustrating a typical embodiment of the present invention;

FIG. 1a is a is a plan view of a modified form of ribbon spacer;

FIG. 2 is an end view of another form of ribbon spacers;

FIG. 3 is a plan view of the ribbon spacer shown in FIG. 2;

FIG. 9 is a sectional view of means for assembling a pair of panels;

FIG. 10 is a fragmentary view of yet another view of peripheral and internal spacer;

FIG. 11 is a sectional view of a panel constructed in accordance with the present invention;

FIG. 12 is a view of a filler or repair plug for use with the panels of the present invention;

DESCRIPTION OF THE PREFERRED EMBODIMENTS OF THE INVENTION

Figure 4:
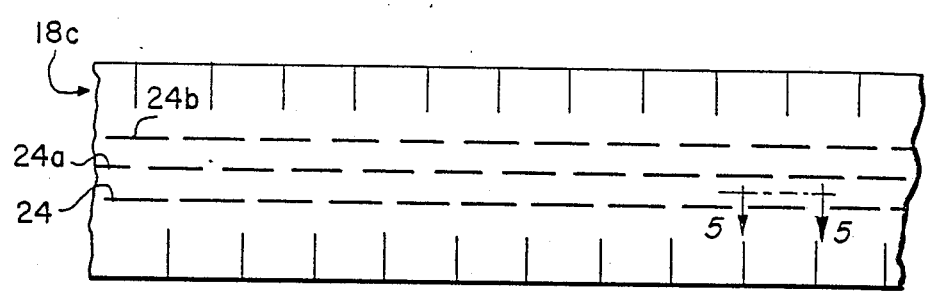
FIG. 4 is a plan view of still another form of ribbon spacer.

Referring now to FIG. 1, the vacuum panel generally designated 10, is composed of a pair of sheets 12 and 14 each having four sidewalls. These sheets 12 and 14 may be constructed of sheet metal such as rolled steel or aluminum or plastic such as fiber glass or glass, foamed glass or foamed plastic. The panels have dimensions, of for example 4×8 feet, 4×10 feet etc. depending upon the ultimate use of the vacuum panel.

Peripherally, about the panel is a spacer 16 which, as to be more fully described hereinafter, may be metal, glass, foam glass, plastic, ceramic, or combinations thereof. The spacer may also be constructed as disclosed and claimed in my U.S. patent application Ser. No. 662,505 filed Oct. 19, 1984 (now U.S. Pat. No. 4,619,098).

The height of the spacers is not critical, but dependent on the ultimate use of the finished panels. For example, if the panels are to be load bearing, the spaces should be of greater height than if the panels are to form a "curtain wall." Thus, the height of the spacers may be as little as ¼ inch and greater than 4 inches for example.

Between the pair of panels 12 and 14 is the internal spacer(s) generally designated 18. In the illustrated form of the invention the spacer(s) 18 is ribbon like and undulated such that there are no straight edges in contact with either of the interior surfaces of panels 12 and 14 which would increase the likelihood of forming a fold line in the panel sheets when a vacuum i drawn interiorly thereof.

The ribbon-like spacers, while undulated, are positioned such that there is uniform spacing between adjacent faces. The support ribbon should not be over 1½ inches from each other, or more than 1½ inches from the end spacers 16. In FIG. 1 there is shown a plurality of the ribbons 18; however, it will be recognized that a single ribbon undulated throughout the entire width and height of the panels may be used, preferably spacing between undulated rows of ribbon spacers would be not greater than about 1½ inches so that the panels above and below are generally not more than ¾ inches from a support member. This will provide practical support for even relatively thin panel sheets when the vacuum drawn on the panel is approximately ½ atmosphere. A vacuum about ½ atmosphere has been found to be entirely satisfactory and creates a very rigid and strong panel for sound and heat with excellent insulation capability which may be used as a structural wall or divider with proper internal structure, preferably using structural members so constructed as to effectively insulate against heat and sound transmissions.

Referring now to FIG. 1a, there is illustrated in plan a ribbon type spacer 18a. In this form of the invention the entire ribbon is undulated in wave form and in addition the ribbon is provided with smaller amplitude waves such as illustrated at 20.

Referring now to FIGS. 2 and 3 the ribbon 18b is notched along its long edges as at 22 dividing the upper and lower edge portions of the ribbon into segments a, b, c, d, etc. and a' b' c' d' etc. on the opposite edge. These segments are thereafter slightly bent outwardly alternately to provide a structure when viewed at the end as illustrated in FIG. 2 for segments a and b and a' and b'. It will be appreciated, in viewing FIG. 2, that a reduced zone of contact is provided along the upper and lower inside surfaces of the panels 12 and 14 and at the same time distributes the force of the atmospheric pressure to the ribbon and to the surface panels which thus have a wider support contact to lessen creasing. Ribbons constructed as shown in FIGS. 2 and 3 would of course also be installed in the panel in wave form as illustrated in FIG. 1 or FIG. 1a.

Figure 5:
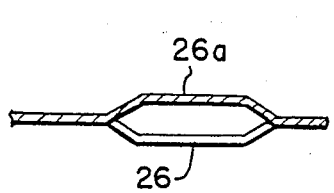
FIG. 5 is a section on line 5—5 of the ribbon shown in FIG. 4.

Referring now to FIGS. 4 and 5, a further reduction in thermal transmission of the panel is provided by slitting or perforating the ribbon 18c with slots 24, 24a and 24b or holes which may be vertically offset as illustrated. These slits or slots in some forms of spacer further reduce thermal transfer between the top and the bottom panels 12 and 14. The vertical interior support strips 180 could have several lines of horizontal slits spaced so the top and bottom of the ribbon would still be attached. The strip slots could be made on a rollformer and then run through a very simple tooth wheel that would cause alternate opposing strips to be given an undulating form and the strip next to it, given an undulating form, but on opposite pattern so that the wave patterns touch only at crossing points that will give plenty of compression strength, be cheap to make in production, and have lateral stability. When the panels are put together, the ribbons could be glued in place on one panel at least, by prior spraying of the panels with adhesives, so if a leak occurred, the ribbons would not then slide out of position to make the panel beyond repair.

A further reduction in thermal transfer is provided as shown in FIG. 5 when the ribbon is slightly bent first one way then the other at each of the slits 24 thus one edge of the slit is designated 26 and its counterpart is designated 26a. This is done to prevent the opposing edges of the slits if they were in vertical alignment from being pressed together and making contact by the vacuum pressure between the panels compressing the 0.015" and slits until contact is made unless the faces of the slits are very slightly offset so that vacuum pressure does not cause contact.

The slits 24, 24a and 24b are no longer than approximately 1 inch where the upper and lower surfaces of the slits are bent outwardly as illustrated in FIG. 5 or otherwise the bending of the slitted material would render it more difficult to form the ribbon in its undulated wave form pattern.

The number and type of deformation of the slits provided in the ribbon will determine compression strength, the sound and the thermal insulation of the resulting panels.

Figure 6:
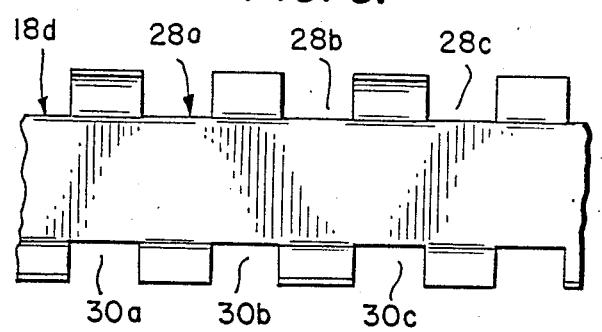
FIG. 6 is a plan view of still another form of ribbon spacer.

Referring now to FIG. 6 the ribbon 18d is provided with upper and lower notches 28a, 28b, 28c etc. along one edge and 30a, 30b, 30c etc. along the other edge. The upstanding tabs remaining after removing or folding initially to form the notches, may be left in the same plan as the ribbon 18d or alternately bent first to the left and then to the right so that only a small edge is in contact with the pair of panel sheets 12 and 14.

Figure 7:
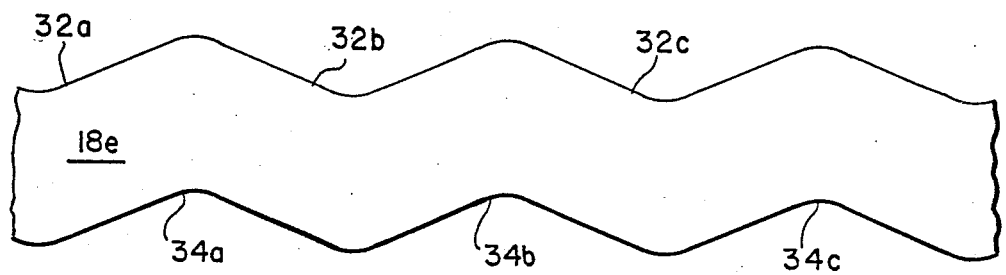
FIG. 7 is a plan view of yet another form of ribbon spacer.

A further reduction in heat transfer is provided as shown at 18e in FIG. 7 wherein the notches are curvilinear as at 32a, 32b, and 32c along one edge and 34a, 34b, 34c etc. along the opposite edge.

Again as discussed in respect to FIG. 6 the upstanding curvilinear portions remaining after removal of the notches may be bent alternately in opposite directions leaving only a small zone of contact between the panel sheets and the support ribbon.

The ribbons of FIGS. 6 and 7 would, as previously discussed, be undulated in constructing the panel.

Figure 8:
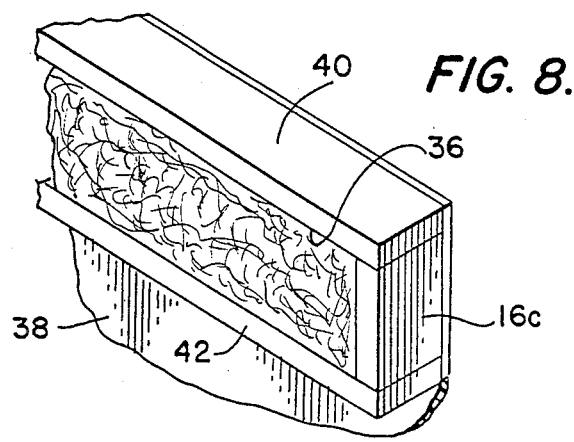
FIG. 8 is a perspective view of a portion of a modified form of peripheral spacer for the panel of the invention.

Referring now to FIG. 8, there is illustrated a peripheral support member 16c which has a hollow interior 36. In order to retain a vacuum within the panel a plastic sheet 38, such as mylar, having a good life span, is glued or cemented to spacer 40 and 42 to present the plastic film to the ambient atmosphere and the film is tightly engaged when a vacuum is pulled within the panel. The hollow frame or solid resistant member may be glass, foamed glass, concrete, ceramic or plastic and the like as desired to prevent creasing of the panels and heat transfer between panels 16 and 14.

Referring now to FIG. 9, there is illustrated first and second panels A and B. The vertical side edges 44 of each of the panels A and B have the peripheral support members 16d inset from the lateral edges 46 a distance such that a key support 48 may be inserted there between to provide a very convenient way of attaching a pair of panels along their vertical side edges. The key support 48 may be glued or screwed in the inserted position to provide weight bearing rigidity and weather resistance as illustrated at 43. Further fasteners such as screws 41 are helpful in maintaining the panels in their assembled configuration.

Also in Section B of FIG. 9, there is shown at 49, that the internal surfaces of the panels are foam sprayed to improve their sound, heat and cold insulation properties.

Referring now to FIG. 10 of the drawing there is shown a panel 10a particularly useful where the panel is a load-bearing panel. In this form of the invention there is provided the peripheral structural support beam to give weight bearing and wind force strength to the structural vacuum panel and optionally in addition a center support beam 50 or a plurality of such internal support beams. In FIG. 10 one of the panels is removed to more clearly illustrate the above described arrangement.

Referring to FIG. 11, the panel 10b having panel sheets 12 and 14 has one of its vertical edge support members 52 projecting outwardly of the lateral edges of the two panel sheets whereas the other edge support beam 54 is inset from edge 56 of panel 12 and edge 58 of panel 14. Now a pair or more of such panels 10b may be mounted with the extending portion 52 of the lateral edge support projecting into the recess in its adjacent panel. Glue, cement, mastic, or other means of the trade may be used in final assembly for physical bond and seal.

Referring now to FIG. 12, in the event that something punctures the panel, it can be repaired, if the rupture is very small, with solder, epoxy resin, or for example an adhesive patch. Since the vacuum within the leaking panel is gone, it becomes necessary to again exhaust the air. To this end a small repair valve like an inverted tire valve unit 60 with a pointed end 62 and peripheral flange 64 is inserted in a small opening 66 made on site for this purpose in the panel sheet 68 so that a small vacuum pump may be attached thereto to restore the lost vacuum.

Figure 13:
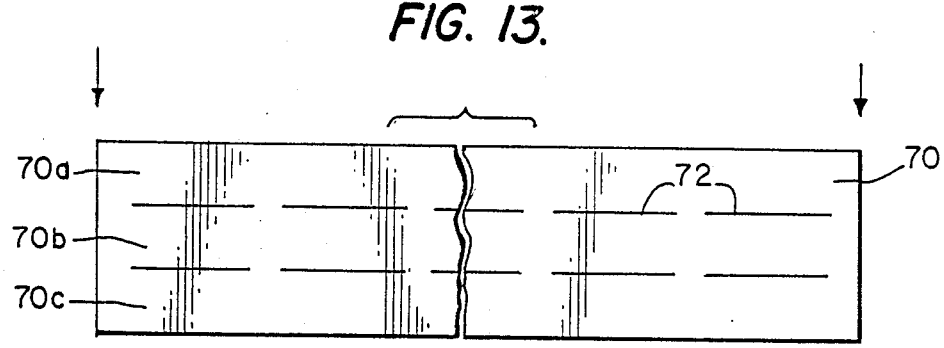
FIG. 13 is a plan view of a further form of a particularly useful form of ribbon.
Figure 14:
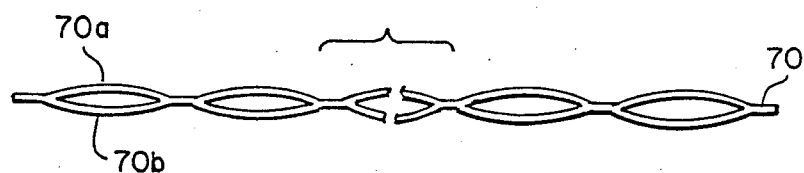
FIG. 14, is a top view of the structure illustrated in FIG. 13 with the slit ribbon bent into a final configuration.
Figure 15:
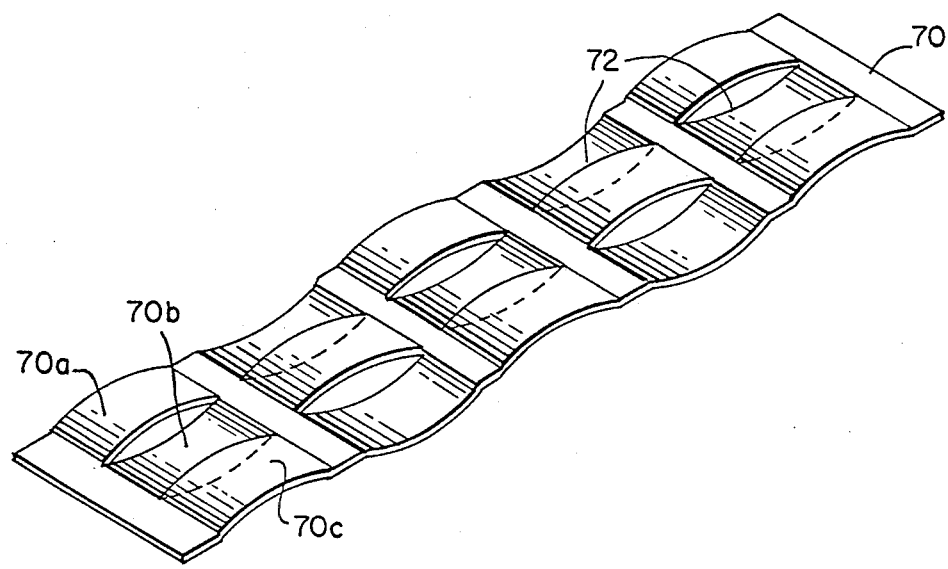
FIG. 15 is a perspective view of the structure shown in FIGS. 12 and 13.
Figure 16:
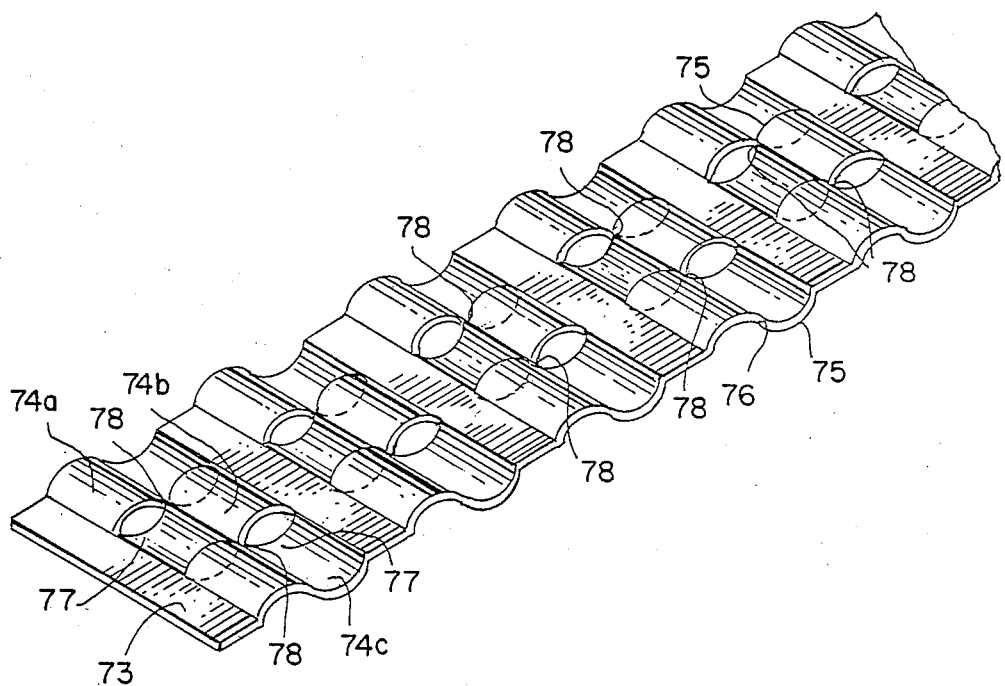
FIG. 16 is a fragmentary perspective view of a modified panel design.

Referring now to FIGS. 13, 14, and 15, a particularly useful form of ribbon construction comprises ribbon 70 wherein there are a plurality of strips of slots 72 parallel to the top and bottom surfaces of the ribbon. The slits 72 divide the ribbon 70 into a plurality of strips 70a, b, and c but for the small zones where the ribbon 70b remains unslit. After slitting, the top and bottom rows 70a and 70c, are bowed or formed into an undulated wave form as best illustrated in FIGS. 14 and 15. The top and bottom rows, 70a and 70b, are warped in the same direction whereas the center row 70b is bowed or warped in the opposite direction, thus when the ribbon is placed between a pair of panel sheets and a vacuum is drawn there between, there is no likelihood of the slits being closed, thus defeating the sound, heat, and cold insulation. From the foregoing, it will be seen that in the illustrated form, three rows of parallel slits are used any odd number of slits would function satisfactorily such as claimed in my U.S. Pat. No. 4,638,615 dated Jan. 27, 1986.

It will be appreciated from the foregoing discussion that various modifications may be made in the panel without departing from the scope of the appended claims, for example, the panel sheet may be brightly polished to increase reflection and reduce transmission of thermal energy; and/or insulating or reflective material could be placed internally of the pair of panel sheets and about the undulated ribbon structural member to reduce radiation from panel to panel and air convectional movement of whatever the remaining air is in a partially vacuumed panel. Where the panel contains insulating materials the insulation is for sound, heat and cold transmission such as might be possible in a partial vacuum though a ½ atmosphere plus will very likely make this further step unnecessary as it is cheaper and easier to reduce vacuum further to limit heat and sound passage. It will also be appreciated that such panels are not only light in weight, easy to construct but provide an excellent fire barrier where the sheet panels forming the vacuum panel are fire resistant or retardant and one panel side can reach a high heat without causing the other side to have a similar performance.

It will also be appreciated that where the panels are to be load bearing and also insulating, that a number of vertical studs may comprise the internal structure of the panel with the undulated ribbons as herein before described between each of the vertical studs. Particularly useful studs are disclosed and claimed in my U.S. patent application Ser. No. 662,505 and entitled "Metallic Structural Member Particularly For Support of Walls and Floors of Buildings".

Because, basically, the effectiveness of the vacuum panels is not related to panel thickness they can be made as thin as, for example, 1 inch and be hung on a light metal frame. Further it will be appreciated that various finishes such as low emissivity and/or low absorbtively exterior or interior panel facing to limit direct passage of heat by direct radiation from one panel sheet to the other and finishes may by applied to one or both side of the panels either before or after installation such as wall paper, special paints, stucco, etc. Further, the panels need not be employed in a vertical plane, but may be panels for under flooring or for a building roof and the final roofing applied by suitable adhesives.

What is claimed is:

1. An internally spaced supported vacuum panel comprising: a pair of substantially parallel facing panel sheets having edges, a plurality of internal spacers for said panel sheets, said internal spacers including a continuous undulating wave form rigidized vertical metal ribbon with a top and a bottom having at least two strips of interrupted slits running parallel the top and the bottom of said vertical metal ribbon, undulating rows formed by the interrupted slits lying one above another in a contoured wave form so that each adjacent row produces a wave form of opposite contour to another adjacent row, said internal spacers being spaced apart, placed inbetween and connected to said panel sheets; and peripheral vertical support spacer members connecting the substantially parallel facing sheets providing an airtight seal to provide a vacuum, whereby when said panel is placed in the vacuum the panel is rigidified and an insulation effect is created in proportion to a degree of vacuum provided, and the slit configuration with the opposing contoured rows being forced together in firm support position with respect to the panels, said vacuum causing the panel sheets to compress the internal spacers and bring the opposite contour wave form of adjacent rows into play as further support.

2. The vacuum panel as defined in claim 1, wherein the peripheral vertical spacers, being made of low conductivity material, are mounted under and parallel to the edges of the sheets of the panels against shoulder strips attached to the inside edges of said sheets so that when vacuum is applied to said panel, said peripheral spacers are thus forced in against said shoulder strips by the vacuum to thus more effectively and rigidly seal the vacuum of the panel around its edges.

3. As in claim 1, adjacent vacuum panels are held in close alignment by the use of a key member being inset into the edges of said panels in space so provided to create a weatherproof wall system.

* * * * *